3,387,009
THIOLCARBOXYLATE ESTERS OF CYCLOPENTADIENYL METALS
Donald E. Bublitz and Guy H. Harris, Concord, Calif., assignors to The Dow Chemical Company, Midland, Mich., a corporation of Delaware
No Drawing. Filed Dec. 4, 1964, Ser. No. 416,103
7 Claims. (Cl. 260—429)

ABSTRACT OF THE DISCLOSURE

The present invention is directed to a group of new and novel thiolcarboxylate esters of certain of the cyclopentadienyl metals and to the method of preparing these compounds.

---

The new compounds of this invention are the thiolcarboxylate esters of alkyl substituted and unsubstituted ferrocenes (I), ruthenocenes (II), osmocenes (III) and cyclopentadienyl-manganese tricarbonyl (IV). These esters (I–IV) are represented by the following formulas

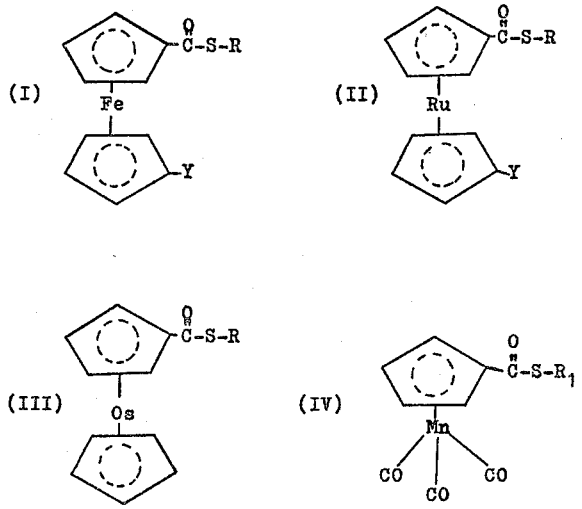

In the present specification and claims R represents primary or secondary alkyl or phenyl, $R_1$ represents methyl, ethyl or phenyl and Y represents hydrogen or

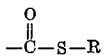

Alkyl, as employed in the present specification and claims, designates primary or secondary alkyl groups containing 1, 2, 3, etc. and up to 8 carbon atoms and from 1 to 2 to 3 to 4, etc. and up to 8 carbon atoms inclusive, such as methyl, ethyl, isopropyl, isobutyl, isoamyl, heptyl, hexyl, octyl, 1-methylbutyl, 1-ethylhexyl, 2-methylheptyl and 1-propylbutyl. The dotted ring in the formula for the cyclopentadienyl moiety denotes the electrons involved in the pi bond between the ring and the metal atom. The compounds of the present invention are liquid or solids which are of very low solubility in water and of moderate solubility in common organic solvents. The compounds have been found to be useful as pesticides for the control of various insect, mite, mollusk, fish, worm, bacterial, plant and fungal organisms such as cockroaches, fireblight, mites, snails, pinworms, tapeworms, goldfish and mildew.

The new thiolcarboxylate esters are prepared by the direct (alkylthio) carbonylation or (arylthio) carbonylation of the cyclopentadienyl metals wherein the cyclopentadienyl metal is reacted with a suitable substituted chlorothiolformate. The reaction is carried out under an inert atmosphere and in the presence of a tri-halide of an element of Group III–A of the periodic table as a thiocarbonylation catalyst.

In carrying out the method of the present invention, the reaction can conveniently be conducted in the presence of an organic liquid reaction medium such as methylene chloride, carbon disulfide, and nitrobenzene. The reaction takes place at temperatures between 0° C. and the decomposition temperature of the cyclopentadienyl metal. Except for cyclopentadienyl manganese tricarbonyl, which decomposes at 65°, temperatures up to 100° are generally suitable. However, temperatures of from 10° to 30° are preferred for all of the cyclopentadienyl metals. After the initial reaction period, the reaction mixture can be maintained at the reaction temperatures for a short period of time to insure completion of the reaction.

The proportions of the reactants to be employed will vary depending upon whether the mono- or bis-thiolester of the cyclopentadienyl metal compound is desired. In preparing the monothiolesters of the cyclopentadienyl metal compounds, the proportions of the reactants to be employed are not critical, some of the desired product being formed upon contacting the reactants in any proportions. However, for optimum yields the substituted chlorothiolformate, the cyclopentadienyl metal and the catalytic tri-halide are employed in equimolar proportions. In the production of bis-thiolesters of the cyclopentadienyl metal compounds of the present invention, the reaction consumes 2 molecules of the substituted chlorothiolformate and 2 molecules of the tri-halide catalyst for every molecule of bis-cyclopentadienyl metal which is di(alkyl- or arylthio)carbonylated. However, the use of the reactants in molar proportions which correspond to the theoretical consumption of reactants yields a mixture of the mono- and bis-thiolesters of the cyclopentadienyl metal compounds. Improved yields of bis-thiolesters compounds are obtained when employing the substituted chlorothiolformate and the Group III–A tri-halide catalyst in molar concentrations equivalent to at least three times the molar concentration of the ferrocene or ruthenocene cyclopentadienyl metal compound to be (alkyl- or arylthio) carbonylated. Representative Group III–A tri-halide catalysts include $AlF_3$, $AlCl_3$, $AlBr_3$, $AlI_3$, $GaBr_3$, $GaCl_3$, $BF_3$ and $InI_3$. Preferred as catalysts are the chlorides and bromides of aluminum and gallium.

In the method of the present invention, the reactants and catalyst can be combined together in any order or fashion under an inert atmosphere. Suitable catalysts are the tri-halides of boron, aluminum, gallium or indium. In a preferred procedure, the reactants are dispersed in an organic liquid as reaction medium. The temperature of the reaction mixture is then maintained at a temperature within the reaction temperature range for a short period of time. Following the reaction period, the desired product is separated and isolated by conventional procedures. In a convenient procedure the reaction mixture is cooled and diluted with ice water. During the dilution period, the diluted mixture separates into an organic and an aqueous phase. The organic phase is separated and low boiling constituents removed by evaporation to obtain the thiolcarboxylate ester of the cyclopentadienyl metal as a liquid or solid residue. This product can be employed for the useful purpose of the present invention or further purified by such common procedures as washing with water or an organic liquid, chromatography or distillation.

Example 1.—Preparation of n-propyl ferrocenethiolcarboxylate

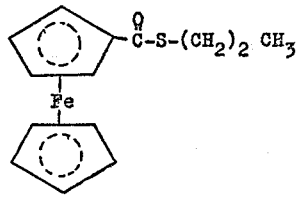

A solution of n-propylchlorothiolformate (13.6 grams; 0.10 mole) in 100 milliliters of methylene chloride is added dropwise with stirring to a mixture of ferrocene (18.6 grams; 0.10 mole) and aluminum chloride (13.3 grams; 0.10 mole) dispersed in 250 milliliters of dry methylene chloride. During the contacting of the reactants the reaction mixture is maintained under nitrogen at a temperature of 0° C. Following the contacting of the reactants, the reaction mixture is allowed to come to room temperature and thereafter the mixture heated to and maintained at the boiling temperature and under reflux for three hours. At the end of the heating period, the reaction mixture is allowed to cool to room temperature and then poured over ice, whereupon the diluted mixture divides into an organic layer and an aqueous layer. The organic layer is separated by decantation and evaporated under reduced pressure, to obtain the product as an oil residue. This residue is dissolved in hexane and the solution poured on a 1.5 inch by 40 inch column containing alumina (activity grade III). The product is eluted from the column with an ether/hexane solution containing 5 percent ether by volume. The eluent is evaporated under reduced pressure to obtain the n-propyl ferrocenethiol carboxylate product as an oil residue having a refractive index of $n_D^{22°}$ 1.6302.

Example 2.—Preparation of ruthenocene-1,1'-bis(phenylthiolcarboxylate)

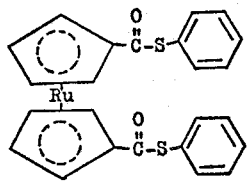

To a solution of phenylchlorothiolformate (51.0 grams; 0.30 mole) and aluminum chloride (40.0 grams; 0.30 mole) in 100 milliliters of carbon disulfide is added, dropwise with stirring, over a 30 minute time period, a mixture of ruthenocene (23.1 grams; 0.10 mole) with 100 milliliters of carbon disulfide. The addition is carried out in a nitrogen environment. The reaction mixture is then heated at the boiling temperature and under reflux for two hours. Following the heating period, the reaction mixture is allowed to cool to room temperature and thereafter diluted with ice water. During the dilution procedure, the diluted mixture divides into an aqueous phase and an organic phase. The organic phase is separated by decantation and the low boiling constituents removed by evaporation under reduced pressure to obtain the ruthenocene-1,1'-bis(phenylthiolcarboxylate) product as a residue having a molecular weight of 505.

Example 3.—The preparation of cyclopentadienylmanganese tricarbonyl 1-methylthiolcarboxylate

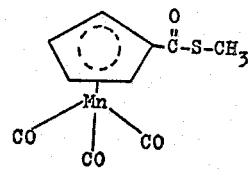

A dispersion of cyclopentadienylmanganese tricarbonyl (10.2 grams; 0.05 mole) and aluminum chloride (6.7 grams; 0.05 mole) in 300 milliliters of methylene chloride is heated, under a nitrogen atmosphere, to the boiling temperature and maintained at reflux. To this refluxing dispersion is added dropwise with stirring a solution of methyl chlorothiolformate (5.5 grams; 0.05 mole) dissolved in 100 milliliters of methylene chloride. Following the contacting of the reactants, the reaction mixture is maintained at the boiling temperature and under reflux for an additional two hours. Thereafter, the reaction mixture is processed as described in Example 1 to obtain the cyclopentadienylmanganese tricarbonyl 1-methylthiolcarboxylate product as a solid melting at 56–58° C.

Example 4.—The preparation of isopropyl ferrocenethiolcarboxylate

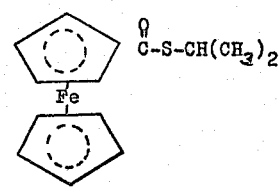

A solution of isopropyl chlorothiolformate (13.6 grams; 0.10 mole) in 100 milliliters of methylene chloride was added dropwise and with stirring to a solution of aluminum chloride (13.3 grams; 0.10 mole) and ferrocene (18.6 grams; 0.10 mole) in 250 milliliters of methylene chloride under nitrogen. Following the contacting of the reactants the reaction mixture is heated, diluted with ice water, the organic phase collected and subjected to evaporation to remove the low boiling constituents and obtain the product as a residue exactly as described in Example 1. This residue is then dissolved in 200 milliliters of hexane and the hexane solution added to an alumina containing column. Thereafter, the column is washed with hexane. The hexane eluent contains the isopropylferrocene by-product of the reaction. The isopropyl ferrocenethiolcarboxylate product is then eluted from the alumina column with an ether hexane solution containing 5 percent ether by volume. The isopropyl ferrocenethiolcarboxylate product is found to have a refractive index of $n_D^{22°}$ 1.6342. The nuclear magnetic resonance spectrum indicates that the product has the structure assigned.

The following compounds of the present invention are prepared by similar procedures.

Ethyl ferrocenethiolcarboxylate (refractive index $n_D^{23°}$ 1.6427) by reacting together ferrocene, ethyl chlorothiolformate and $AlCl_3$.

Ruthenocene 1,1-bis(methyl thiolcarboxylate) (molecular weight 380) by reacting together ruthenocene, methyl chlorothiolformate and $GaBr_3$.

Methyl ferrocenethiolcarbylate (melting point 45–47° C.) by reacting together ferrocene, methyl chloro thiolformate and $BF_3$.

Ferrocene 1,1'-bis(methyl thiolcarboxylate) (melting point 77–79° C.) by reacting together ferrocene, $AlBr_3$ and methyl chlorothiolformate.

n-Octyl osmocenethiolcarboxylate (molecular weight 492) by reacting together osmocene, n-octyl chlorothiolformate and $AlBr_3$.

Ferrocene 1,1'-bis(n-octylthiolcarboxylate) with carbon and sulfur contents of 63.25 percent and 11.88 percent respectively, as compared with the theoretical contents of 63.39 percent and 12.09 percent respectively by reacting together ferrocene, n-octyl chlorothiolformate and GaCl₃.

n-Butyl ruthenocenethiolcarboxylate (molecular weight 406) by reacting together ruthenocene, n-butyl chlorothiolformate and GaCl₃.

Ethyl (cyclopentadienylmanganese tricarbonyl) thiolcarboxylate (refractive index of $n_D^{25°}$ 1.6108) by reacting together cyclopentadienylmanganese tricarbonyl, ethyl chlorothiolformate and AlBr₃.

Phenyl (cyclopentadienylmanganese tricarbonyl) thiolcarboxylate (melting point 52–55° C.) by reacting together cyclopentadienylmanganese tricarbonyl, phenyl chlorothiolformate and AlCl₃.

Phenyl ferrocenethiolcarboxylate (refractive index $n_D^{22°}$ 1.5892) by reacting together ferrocene, n-octyl chlorothiolformate and AlCl₃.

Isobutyl ferrocenethiolcarboxylate (molecular weight 302) by reacting together ferrocene, isobutyl chlorothiolformate and GaBr₃.

n-Butyl ferrocenethiolcarboxylate (refractive index $n_D^{22°}$ 1.6207)) by reacting together ferrocene, n-butyl chlorothiolformate and InI₃.

Methyl osmocenethiolcarboxylate (molecular weight 394) by reacting together osmocene, methyl chlorothiolformate and AlBr₃.

Ethyl ruthenocenethiolcarboxylate (molecular weight 320) by reacting together ruthenocene, ethyl chlorothiolformate and GaCl₃.

Phenyl osmocenethiolcarboxylate (molecular weight 457) by reacting together osmocene, phenyl chlorothiolformate and AlCl₃.

n-Octyl ferrocenethiolcarboxylate (refractive index $n_D^{22°}$ 1.5892) by reacting together ferrocene, n-octyl chlorothiolformate and AlCl₃.

n-Octyl osmocenethiolcarboxylate (molecular weight 493) by reacting together osmocene, phenyl chlorothiolformate and AlCl₃.

Ferrocene 1,1′-bis(phenylthiolcarboxylate) (melting at 104–105° C.) by reacting together ferrocene, phenyl chlorothiolcarboxylate and AlBr₃.

The compounds of the present invention have been found to be useful as the toxic constituent in compositions employed for the killing and control of various plant and animal pests such as worms, insects, fish, fungi, and bacteria. For such uses, the unmodified compound can be employed or the compound can be dispersed on an inert finely divided solid such as talc, chalk or bentonite and employed as a dust. Also, such mixtures can be dispersed in water, with or without the aid of a surface active dispersing agent, and the resulting aqueous suspension employed as sprays, drenches or washes. In other procedures, the products can be employed as the toxic constituent in solvent solutions, oil-in-water and water-in-oil emulsions or aqueous dispersions. In representative operations, compositions containing methyl ferrocenethiolcarboxylate at concentrations of 500 parts per million by weight of ultimate composition given complete kills of American cockroach. In other operations, aqueous compositions containing phenyl ferrocenethiolcarboxylate at concentrations of 300 parts per million by weight give complete kills of fungus powdery mildew of cucumber (*Erysiphe cichorauarum*). In still other operations, aqueous compositions containing isopropyl ferrocenethiolcarboxylate at concentrations of 500 parts per million by weight give complete kills of Two Spotted Spider mites.

We claim:
1. The thiolcarboxylate esters of cyclopentadienyl metals selected from the group having the formulae

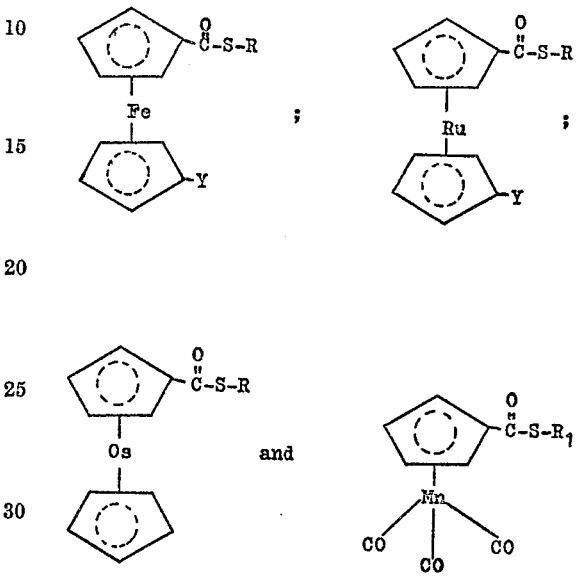

wherein R represents a member of the group consisting of primary alkyl, secondary alkyl and phenyl, R₁ represents a member of the group consisting of methyl, ethyl and phenyl, and Y represents a member of the group consisting of hydrogen and

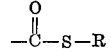

2. Methyl cyclopentadienylmanganese tricarbonyl thiolcarboxylate.
3. n-Butyl ferrocenethiolcarboxylate.
4. Methyl ferrocenethiolcarboxylate.
5. Isopropyl ferrocenethiolcarboxylate.
6. Ferrocene 1,1′-bis(phenylthiolcarboxylate).
7. Ferrocene 1,1′-bis(methylthiolcarboxylate).

References Cited

UNITED STATES PATENTS 3,321,501    5/1967    Wilkus et al. _____ 260—429

OTHER REFERENCES

Cotton et al., Chemistry and Industry (London) October 1958, pp. 1368–9.

Schlögl et al. Annalen der Chemie 651 (1962) pp. 1–10.

TOBIAS E. LEVOW, *Primary Examiner.*

A. P. DEMERS, *Assistant Examiner.*